United States Patent [19]
Sandt

[11] Patent Number: 5,858,493
[45] Date of Patent: Jan. 12, 1999

[54] TAPERED COMPOSITE STRUCTURAL MEMBER AND METHOD OF MAKING SAME

[76] Inventor: Hartley Sandt, 2425 Dogwood La., Orange Park, Fla. 32073

[21] Appl. No.: 714,685

[22] Filed: Sep. 16, 1996

[51] Int. Cl.$^6$ ................................................ B29D 22/00
[52] U.S. Cl. .................... 428/36.91; 52/736.3; 52/737.4; 52/738.1; 428/36.9; 428/36.92
[58] Field of Search ............................... 428/36.9, 36.91, 428/36.92; 52/736.3, 737.4, 738.1

[56] References Cited

U.S. PATENT DOCUMENTS

| | | | |
|---|---|---|---|
| 2,768,921 | 10/1956 | Pigg . | |
| 5,004,574 | 4/1991 | Sandt | 264/101 |
| 5,405,668 | 4/1995 | Sandt | 428/36.9 |
| 5,576,081 | 11/1996 | Sandt | 428/36.9 |

Primary Examiner—Melvyn I. Marquis
Assistant Examiner—D. Aylward
Attorney, Agent, or Firm—Arthur G. Yeager

[57] ABSTRACT

A tapered pole for supporting electric power lines, telephone lines, or an electric lamp which includes two tapered plastic, generally rigid sleeves positioned concentric to a longitudinal axis with the space between the sleeves being filled with a plurality of longitudinal generally continuous filaments encased in a solid plastic material; and a method of preparing such a pole by pushing or pulling the inside sleeve into an outside sleeve while filling the space between the sleeves with a liquid plastic material with reinforcing fibers or filaments being positioned into the space as movement occurs and the liquid plastic fills that space. The fibers are generally continuous and the per inch distribution between the ends of the pole are generally equal. End caps seal the ends against the weather elements.

20 Claims, 6 Drawing Sheets

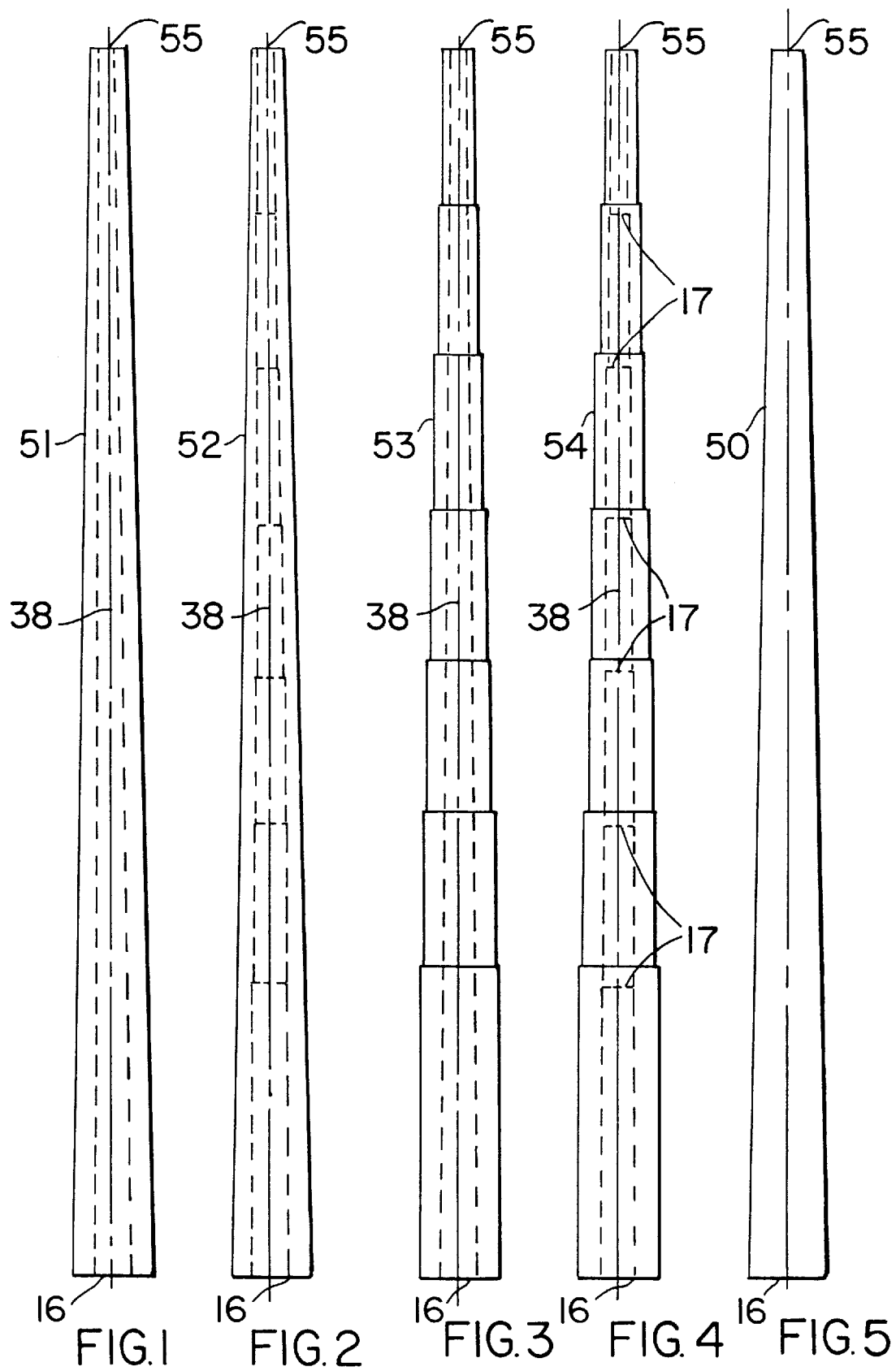

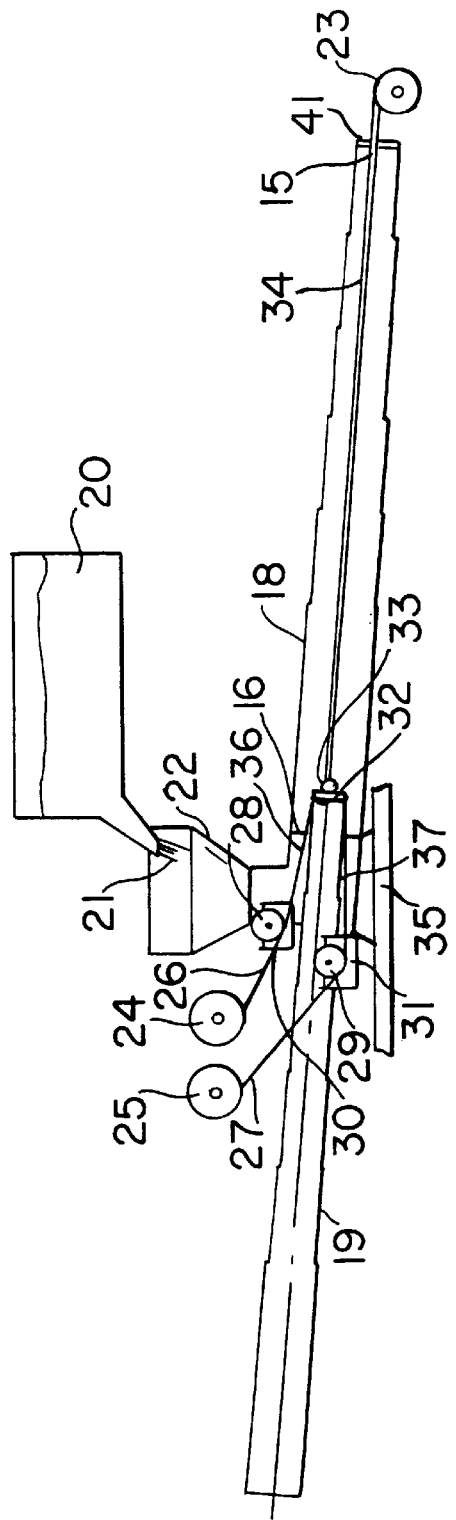
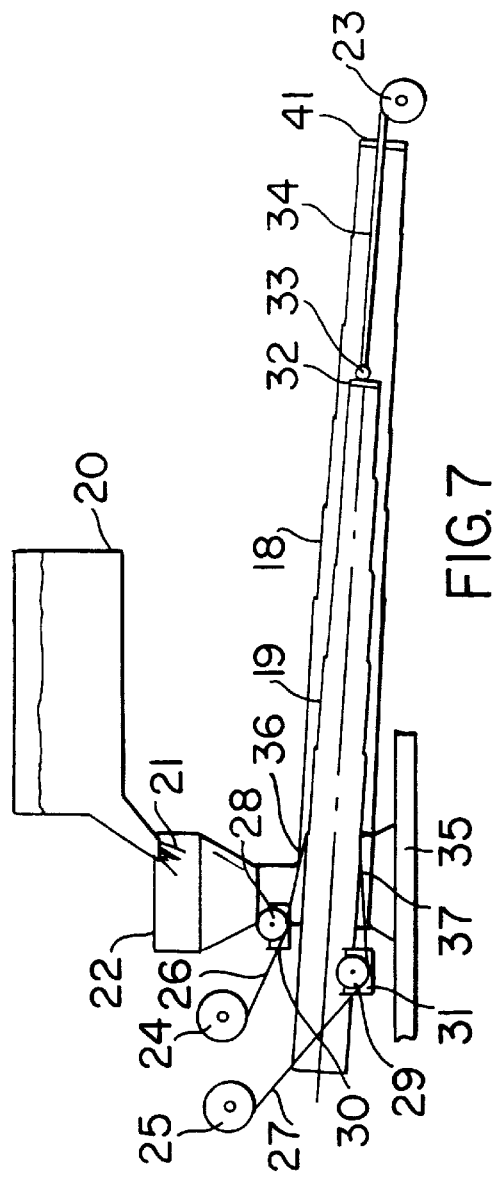

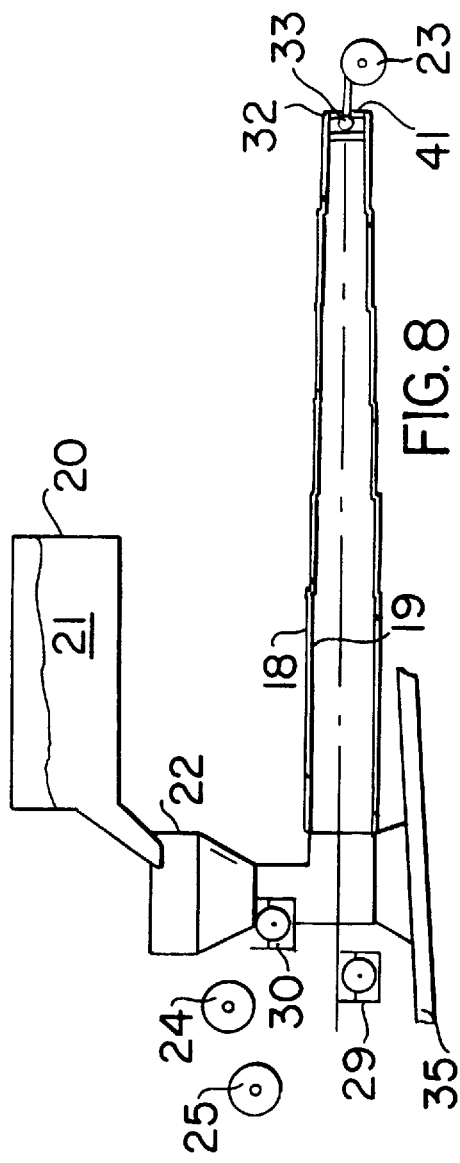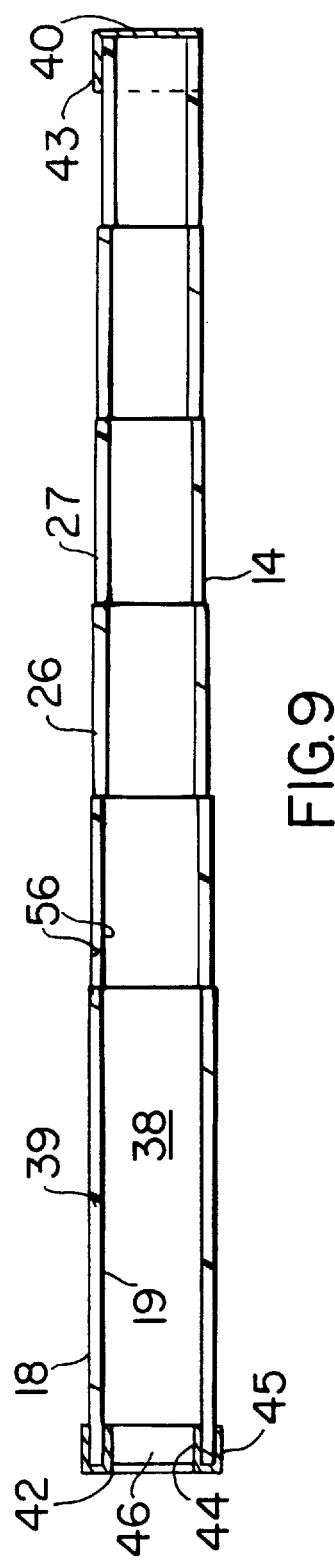

TAPERED COMPOSITE STRUCTURAL MEMBER AND METHOD OF MAKING SAME

TECHNICAL FIELD

This invention relates to various structural elements, such as poles for supporting electric power lines; and more particularly it relates to solid and hollow poles and other structural elements made of plastic materials that are reinforced in strength by filaments encased in the solid plastic of the pole or element and running lengthwise of the pole or element.

BACKGROUND OF THE INVENTION

The applicant has shown in U.S. Pat. Nos. 5,004,574 and 5,405,668 various structural shapes of plastic rods and tubes which are reinforced in strength by the presence of fibers or filaments running lengthwise and being encased in the plastic. Methods for making such items are also disclosed in these patents. Among the uses for such technology is the making of poles to replace wooden poles that are getting more costly as less wood is available for such uses. Wooden poles are subject to deterioration from the atmosphere and from being buried in the soil. Plastic materials can readily replace wooden poles in many, if not all uses, and it accordingly is the primary purpose of this invention to provide a method for preparing poles, beams or other structural load bearing elements from plastic materials. In order to reduce weight and cost it is preferred that such poles, beams or elements be made hollow; and in order to provide sufficient strength for minimum volumes, it is preferred that the plastic material be reinforced by fibers or filaments generally running lengthwise of the element so as to provide flexural strength. This invention is useful for structural cantilever members, e.g., in airplane wings, spars or the like; masts or poles of any size or shape, e.g., power poles for high tension electricity, poles for lights, fence poles and poles and beams for all sorts of building or construction supports.

BRIEF SUMMARY OF THE INVENTION

This invention relates to an article of manufacture and to a method for preparing that article. The article of manufacture is a tapered load-bearing structural member, such as a pole or beam with a large diameter end that may be buried in the ground or otherwise supported in a fixed manner or cantilevered out from a structure and a small diameter end that may be vertically above ground for supporting any of a variety of objects, e.g., power lines, telephone lines, illuminating lights or merely a wire fence. A preferred structural element is a pole made of two concentric, generally rigid sleeves separated by a space filled with a solid plastic material having dispersed therethrough reinforcing fibers or filaments running lengthwise of the pole and being present at a generally uniform density of filaments to resin at any transverse cross-section of the pole. The sleeves may be of any convenient thickness, depending on the overall size of the pole, e.g., 0.25–1.0 inch thick for a pole 6–40 feet tall. The core of plastic and dispersed reinforcing fibers or filaments may be 0.5 to 3.0 or more inches thick depending on the strength required in the pole and its dimensions. The diameter of the central hollow may vary with the specific design of the pole. Generally the materials employed for the sleeves are thermoplastic resins that may be readily extruded into hollow tubular forms and blow molded or rotationally molded into conical elements. The central core is generally made of a reactive resin, such as an amine-formaldehyde resin. The reinforcing fibers or filaments may be glass, metal, carbon, natural fibers or filaments or synthetic fibers or filaments. A particularly good combination employs polyvinyl chloride sleeves, polyester, epoxy or phenolic reactive resin in the core and glass fibers for reinforcements.

The hollow structural member of this invention may be made by a variation of the process of U.S. Pat. No. 5,004,574 in which preformed inner and outer sleeves are aligned so as to relatively move the sleeves with respect to each other, as by pulling the inner sleeve into the outer sleeve while filling the space between those sleeves with a resin in liquid form, and simultaneously pulling fibers or filaments into that circumferential space so as to extend throughout the length of the pole and thereafter capping the ends.

Another preferred structure of this invention is a solid tapered pole with only one sleeve which is an outer covering for a solid core of plastic material in which are dispersed lengthwise fibers or filaments.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a side elevation view of a long pole of this invention having a smooth tapering outside surface and a smooth tapering inside surface around a central tapering hollow;

FIG. 2 is a side elevational view of a long pole of this invention having a smooth tapering outside surface and a stepped tapering inside surface around a central tapering hollow;

FIG. 3 is a side elevational view of a long pole of this invention having a stepped, tapering outside surface and a smooth tapering inside surface around a central tapering hollow;

FIG. 4 is a side elevational view of a long pole of this invention having a stepped tapering outside surface and a stepped tapering inside surface around a central tapering hollow;

FIG. 5 is a side elevation of a long tapered pole of this invention which has a solid interior;

FIG. 6 is a schematic illustration of the beginning of a process of this invention whereby the small end of a hollow stepped tapering inside sleeve is being introduced into the large end of a hollow stepped tapering outside sleeve to be pulled into place as liquid resin and reinforcing filamentary material is introduced into the space between the outer and inner sleeves;

FIG. 7 is a schematic illustration of the middle of he process described above with respect to FIG. 6;

FIG. 8 is a schematic illustration of the end of the process depicted in FIGS. 6 and 7;

FIG. 9 is a longitudinal cross-section of a long hollow pole made by the process shown in FIGS. 6–8;

DETAILED DESCRIPTION OF THE INVENTION

The process and product of this invention are best understood by reference to the attached drawings which show preferred embodiments of this invention.

The drawings of FIGS. 1–4 show typical examples of the articles made according to this invention. There are shown four varieties of poles 51–54 that taper from a small end at 55 to a large end at 16 and each having a central hollow 38 extending the entire length of the pole. Each of these poles 51–54 in FIGS. 1–4 has at any transverse cross-section a circular external shape and a circular internal shape. Other shapes, however, are contemplated in accord with this invention. In some instances the surface (internal or external) may be smooth; and in other instances the surface may be stepped. "Stepped" herein means a series of cylindrical surfaces, each succeeding step being of a slightly smaller or larger diameter than the preceding step while the surface in any one step is a single diameter. In the instance of FIG. 5 where both inside and outside surfaces are stepped, it is preferred to offset the juncture 17 between adjoining steps in the interior surface from that similar juncture in the exterior surface so as to avoid any weakened locations in the pole. If there were no offset, the thickness of the pole wall might at each step be thinner than desired; and by offsetting that juncture so that the inside and outside steps do not occur at the same location, that potential weakness is avoided. "Stepped" herein also relates to shapes other than cylindrical.

There are shown here poles with circular cross-sections. It is to be understood, however, that this invention contemplates other shapes, such as described more fully in my U.S. Pat. No. 5,004,574 with respect to FIGS. 3–5 of such patent, e.g., triangular, rectangular, square, pentagonal, hexagonal, and the like. These shapes of outside skins or sleeves may be combined with similar inside shaped sleeves, or other dissimilar inside skins or sleeves, such as is shown by poles 52 and 53 in FIGS. 2 and 3 of this application. Other structures, such as masts, beams, spars, rods, tubes, etc. are encompassed in this invention.

Figure 10:
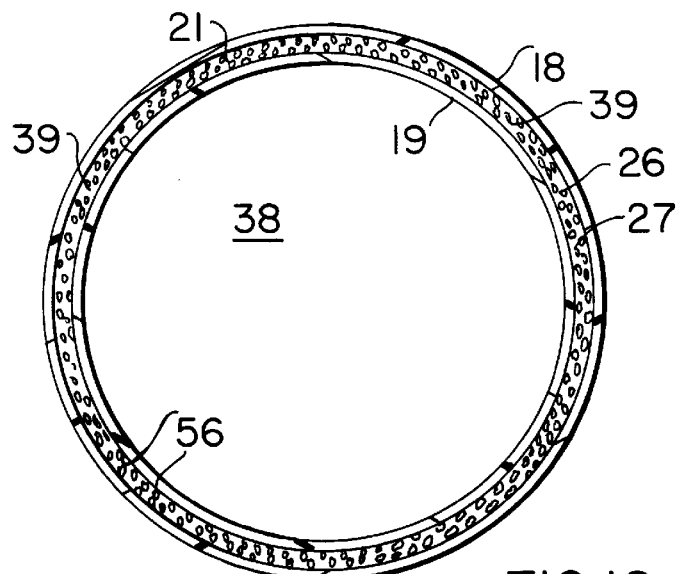
FIG. 10 is an enlarged transverse cross-section of the long hollow pole shown in FIG. 9.

The process of preparing the poles of FIGS. 1–4 is shown in FIGS. 6–8, and the pole made by this process is shown in FIGS. 9–10. In FIG. 6 there may be seen the general features of the manufacturing process which starts by positioning an inside generally rigid sleeve 19 and an outside generally rigid sleeve 18 along a common longitudinal axis which is an extension of the direction of cable 34 and supporting these sleeves (by means not shown) as they are telescoped together to make the final product as shown in FIGS. 9–10. The larger and smaller sleeves 18 and 19 are formed by ordinary extrusion methods which are not part of this invention. These sleeves may be of whatever thickness that is appropriate, probably from 0.25 to 1.0 or more inches in thickness, and are made from a suitable thermoplastic material, a preferred type being polyvinyl chloride. The larger sleeve 18 is positioned in a generally horizontal position, preferably tilted downward toward the small end (to the right in FIGS. 6–8) so that liquid reactive resin introduced inside the sleeve will gravitate toward the small end. The smaller sleeve 19 is aligned so as to enter inside the larger sleeve 18 and be pulled to align both ends and thereby produce a hollow tapered pole when the process is completed. The smaller end of the smaller sleeve 19 is fitted with a plug 32 having an eye 33 through which pulling cable 34 is threaded and wound onto drum 23 which can be driven like a windlass to wind up cable 34 on drum 23 as smaller sleeve 19 is pulled completely into larger sleeve 18. For the sake of simplicity no details are shown as to how to support sleeves 18 and 19 during this process, but it will be appreciated that such may be accomplished by movable belts, a plurality of freely rotatable drums or discs, or other more complicated means. There may also be a second plug 41 at the smaller end of larger sleeve 18 to prevent too much leakage of liquid reactive resin, if such a plug is needed; although the liquid reactive resin is quite viscous and will begin hardening sufficiently to minimize any such leakage and may obviate the need for second plug 41.

Mounted above the larger end 16 of sleeve 18 is a supply of liquid reactive resin 21 in reservoir 20 that empties into hopper 22 supported on frame 35 and drains through channels into the space between larger sleeve 18 and smaller sleeve 19 at the large end 16 of sleeve 18. That liquid reactive resin is fed slowly to match the slow forward movement (to the right in FIGS. 6–8) of smaller sleeve 19 into larger sleeve 18. Simultaneously there is introduced into that same space between sleeve 19 and sleeve 18 reinforcing filaments represented by 26 and 27. These filaments 26 and 27 are unwound from spools 24 and 25 and passed through pools 30 and 31 of liquid reactive resin 21, so as to wet the filament before it is immersed in resin 21 which fills the space between sleeves 18 and 19. Pools 30 and 31 may contain spools or pulleys 28 and 29 to assure that filaments 26 and 27 are totally immersed in pools 30 and 31 and totally wetted by the liquid resin therein. There are shown in FIGS. 6–8 only two spools 25 and 26 and their separate wetting pools 30 and 31, but it is to be understood that this process will include several other similar spools of filament and pools of wetting resin sufficient to introduce reinforcing filaments throughout the circumferential space 50 between sleeves 18 and 19 so as to produce the finished pole structure of FIGS. 9 and 10. As may be seen in FIG. 10 the cross-section shows outer sleeve 18 and inner sleeve 19 around a hollow center 38. The space 56 between sleeves 18 and 19 is filled with a solid reactive resin 21 through which are dispersed a large number of individual filaments such as 26 and 27 running the entire length of the pole and after solidifying form a reinforced core 39. It is important for this invention that the tapered structural and load bearing article have more filaments in the larger end than in the smaller end so that the density of filaments at any cross-section of the article will be generally equal and preferably substantially equal to provide uniform flexural strength in any direction at respective cross-sections. The "reactive resin" as used herein is preferably a liquid thermoplastic resin which is used as a liquid and sets to a hard solid. Such materials are technically known as polyester, epoxy, phenolic, or urea resins which solidify from a liquid form to a hard insoluble final product. Heat is frequently applied to accelerate the hardening or setting of the resin.

FIG. 7 shows the process as started at FIG. 6 and which has progressed until small end of inner sleeve 19 with plug 32 is about half way into larger sleeve 18. FIG. 8 shows the process completed when the smaller ends of both sleeves 18 and 19 are aligned. The introduction of resin 21 is then stopped, the feeding of filaments from reels 24 and 25 is stopped, and windlass 23 is stopped. As soon as the resin in the space 56 between inner sleeve 19 and outer sleeve 18 hardens into a solid core 39, plugs 32 and 41 can be removed and the article will be that shown (in larger scale) in FIGS. 9 and 10. Generally the proportion of filament to resin in the space 39 between sleeves 18 and 19 will be about 50–60% by weight of filament and 40–50% by weight of resin for maximum flexural strength. Other ratios of filament-to-resin are generally operable for other purposes. For a 40-foot pole used as a support for power lines the outer diameter at the larger end of the outer sleeve 18 might be 5"–10" and the inner diameter of the inner sleeve 19 at the larger end might be 4"–6" leaving a space 56 between sleeves 18 and 19 of 1"–4" thick to be filled with reactive resin and filaments in a ratio of 50–75% filament and 50–25% resin by weight.

It should be noted that it may be advantageous to employ end caps 40 and 42 (see FIG. 9 herein) over the ends of such poles as shown in FIG. 10 of U.S. Pat. No. 5,004,574 to protect the resin-and-filament structure in the space between outer sleeve 18 and inner sleeve 19 from the damaging effects of weather, air, moisture, sunshine, etc. End caps 40 and 42 are shown over the ends of the finished pole in FIG. 9 of the attached drawings. Such end caps 40 and 42 are preferably sealed by adhesives or other means to outside sleeve 18 so as to prevent moisture or other destructive materials from contacting core 39. The end caps 40 may be generally flat or slightly convex with a single surrounding flange 43. The end cap 42 may have a hollow 46 generally medially with a pair of spaced surrounding flanges 44 and 45 lying against and sealed to sleeves 19 and 18 respectively.

Figure 11:
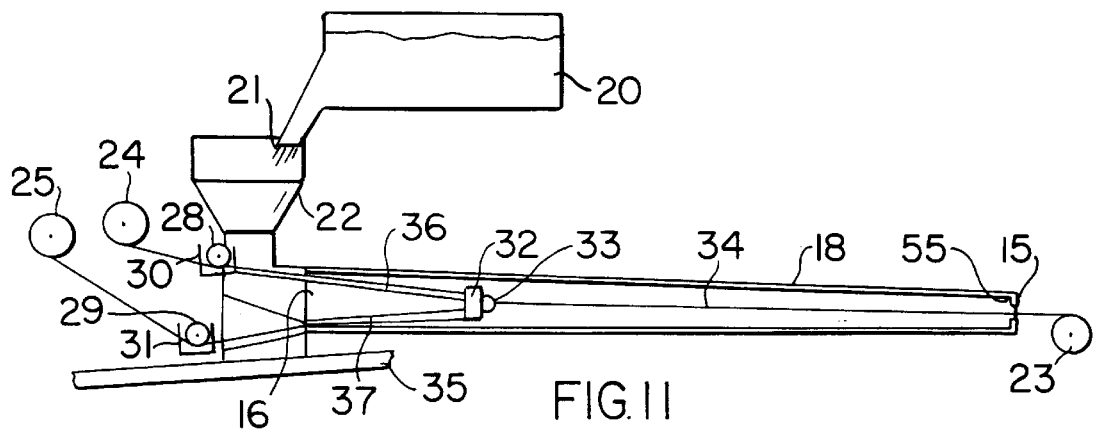
FIG. 11 is a schematic illustration of a process of this invention similar to those shown in FIGS. 6–8 except that the product is a solid article.
Figure 12:
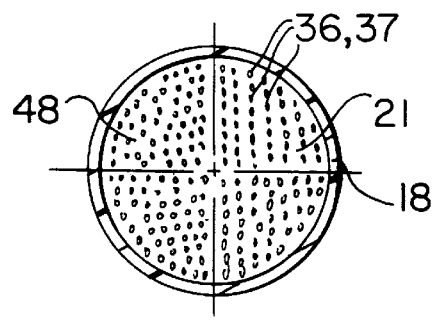
FIG. 12 is a transverse cross-section of a solid pole, such as shown in FIG. 5 and made by the process at FIG. 11.
Figure 13:
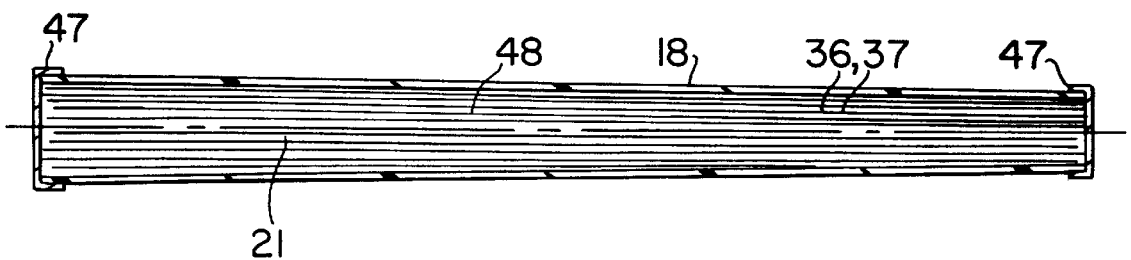
FIG. 13 is a longitudinal cross-section of the pole of FIG. 12.

FIG. 11 shows a process for preparing the solid interior pole of FIG. 5. This pole has only one sleeve, that being an outer sleeve, that being an outer sleeve 18 which is filled with a solid core 48 of reactive resin 21 and lengthwise filaments 36, 37 dispersed throughout the reactive resin. The process of manufacturing this solid pole is similar to that described above with respect to FIGS. 6–8 except that there is no inner sleeve nor a central hollow. The outer sleeve 18 is positioned in a generally horizontal position with plug 32 attached through eye 33 to windlass 23 by cable 34. Plug 32 has a plurality of reinforcing fibers, such as 36 and 37, attached thereto and these filaments are pulled from large end 16 to small end 55 of the sleeve 18 as it is filled with reactive resin 21 fed from reservoir 20 into hopper 22 supported on frame 35 and thence into large end 16 of sleeve 18 at large end 16. When this process is completed the cross-section of sleeve 18 filled with a solid core 48 of resin 21 and filaments 36, 37 is that shown in FIG. 12 as a transverse cross-section and in FIG. 13 as a longitudinal cross-section also showing end caps 47 similar to end cap 40 of FIG. 9.

Figure 14:
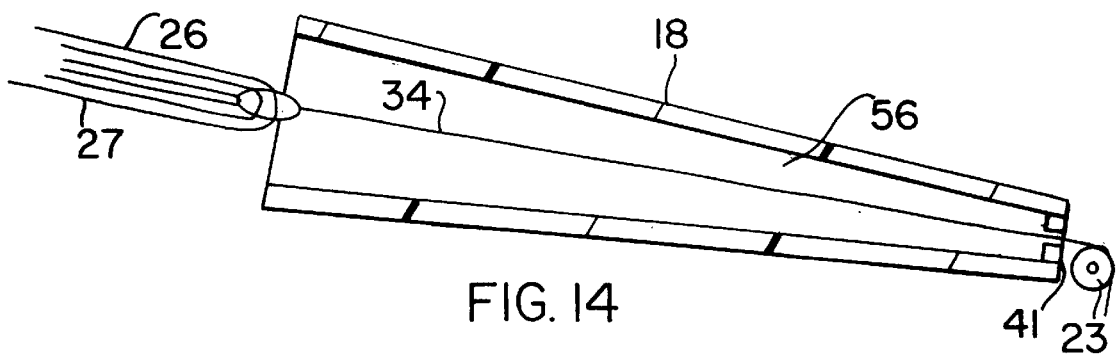
FIG. 14 is illustration of the initial bundle of filaments saturated with resin being pulled into the tapered outer casing.
Figure 15:
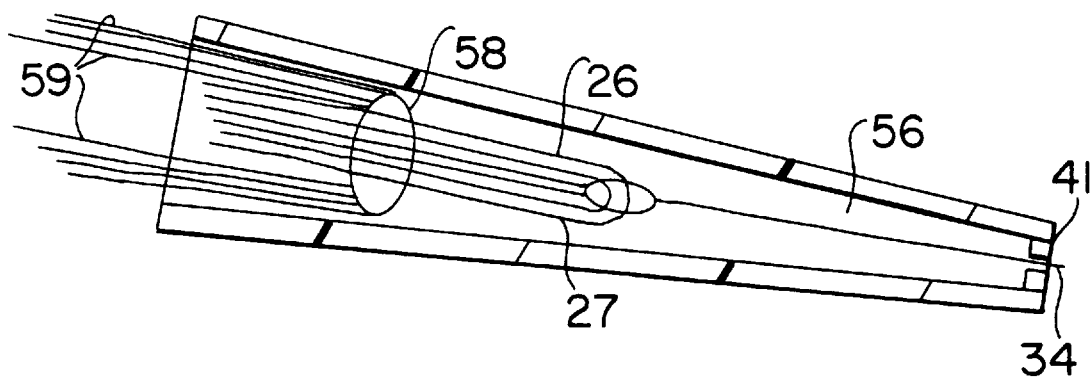
FIG. 15 is an illustration similar to FIG. 14 and showing additional filaments being carried by a looped filament at a successive length spaced from the forward small end of the casing.
Figure 16:
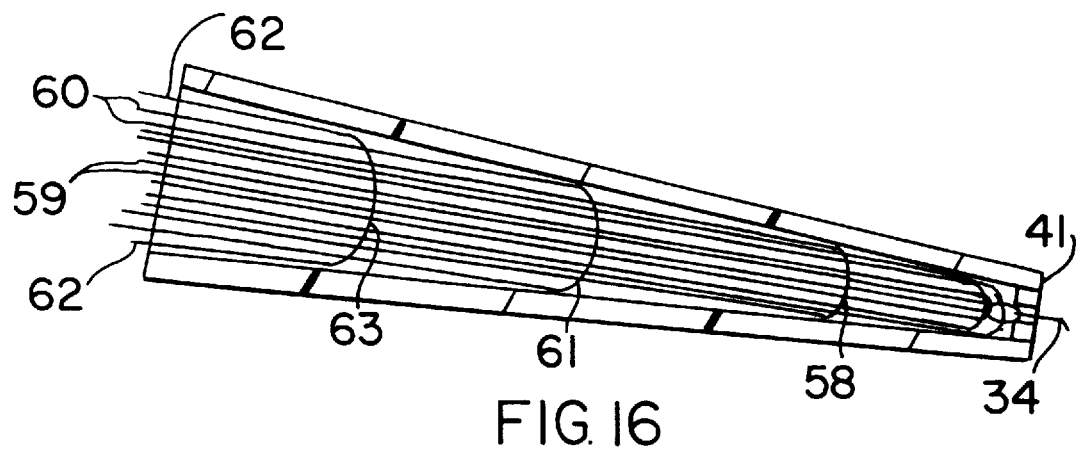
FIG. 16 is an illustration similar to FIG. 15 and showing spaced looped filaments carrying additional filament bundles into and along the length of the casing.

Any convenient method may be used in introducing an increasing number of reinforcing filaments into space 56 between inner sleeve 19 and outer sleeve 18 as the process proceeds from inserting small end 55 of inner sleeve 19 into large end 16 of sleeve 18 to the end of the process when sleeve 19 is completely inserted into sleeve 18. One preferred method is depicted in FIGS. 14–16 and includes tying at several spaced locations along the first reinforcing filaments 26, 27 introduced into space 56 a loop 58 of filament tied to, for example, filaments 26 and 27 and others, to which are tied bundles of other filaments 59 that will extend from that loop 58 to the large end of sleeves 18 when the process is completed. the next bundle of filaments 60 tied to successive loop 61 are distributed circumferentially within sleeve 18 so as to fill that space 56 with reinforcing filaments. Additional bundles of filaments 62 are similarly introduced by being tied to successive loops 63 farther along the length of sleeve 18 (or sleeves 18 and 19) as they are pulled together in the process. In this way there are more reinforcing filaments at the large end of space 56 than at the small end of space 56 to provide greater flexural strength at the large end where it may be fixed, as with a high tension electric pole or the like. Ideally, the filaments will be distributed at any cross-section such that the density thereof in the core 39 or core 48 will be uniform.

In the event that cross-arms are needed for the poles of this invention the process described herein can readily be employed to prepare nontapered lengths for such uses, and such arms could be equipped with end caps as described above, in order to prevent any rapid deterioration of the core due to weathering in the atmosphere. Such cross-arms may have an upper surface to minimize the accumulation of snow or ice thereon.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. An elongated load bearing tapered structural member having a larger cross-section at one end of said member and a smaller cross-section at another end of said member; said member comprising a tapered external generally rigid sleeve forming an outside cover of said member, and being filled internally with a reinforced plastic material including a solid reactive resin having uniformly dispersed therein reinforcing filaments running lengthwise of said member and being present at a generally uniform density of filaments to resin at any transverse cross-section of said member.

2. The structural member of claim 1 in which said sleeve is a thermoplastic material.

3. The structural member of claim 1 in which said reactive resin is a thermosetting material.

4. The structural member of claim 1 in which said reinforcing filaments are selected from the group consisting of metal, glass, carbon fiber, natural fiber, and synthetic fiber.

5. A load bearing tapered tubular pole having a large cross-section lower end portion and a smaller cross-section upper end portion, said pole comprising a tapered external generally rigid sleeve spaced outwardly from a tapered internal generally rigid sleeve, each said sleeve being formed of a plastic material adapted to weather environmental elements, a solid core of reactive resin filling the space between said sleeves and having dispersed therein a plurality of reinforcing filamentary material running generally lengthwise of said core; said pole having a central lengthwise axial void inside said internal sheath extending from said lower end portion to said upper end portion.

6. The tubular pole of claim 5 wherein said core is encapsulated in a continuous housing of a corrosion-resistant plastic material.

7. The tubular pole of claim 5 wherein said reinforcing filamentary material includes a plurality of continuous filaments of metal, glass, carbon, natural fiber, or synthetic fiber.

8. The tubular pole of claim 5 wherein said plastic material of at least one of said sleeves is a thermoplastic material.

9. The tubular pole of claim 5 wherein each of said sleeves is a thermoplastic material.

10. The tubular pole of claim 5 wherein said core is formed by a thermosetting material.

11. The tubular pole of claim 5 further comprising a pair of spaced end caps covering said core and sealed to said sleeves adjacent respective ends, said end caps being of a corrosion-resistant material and sealed to said outer sleeve.

12. The tubular pole of claim 5 wherein said reinforcement fibers are distributed substantially equally circumferentially in said core around said void.

13. The tubular pole of claim 11 wherein the number of said reinforcement fibers per square inch of cross-section of said core at said upper end is generally equal to the number of said reinforcement fibers per square inch of cross-section at said lower end portion.

14. The pole of claim 5 wherein said external sleeve is a series of axially connected constant diameter segments, each segment decreasing in diameter from the previous segment when viewed successively from said lower end portion to said upper end portion.

15. The tubular pole of claim 5 wherein said external and internal sleeves are formed of polyvinylchloride, said core is formed of a thermosetting resin, and said reinforcing filamentary material is formed of substantially continuous elongated glass fiber.

16. A process for manufacturing a filamentary reinforced plastic hollow structural load bearing member, comprising positioning a tapered generally rigid hollow outer sleeve in a generally horizontal position with a tapered hollow inner sleeve positioned with its smaller end inside the larger end of the outer sleeve and the remainder of the inner sleeve generally aligned horizontally so as to be moved axially inside the outer sleeve; relatively moving the sleeves so that the smaller end portion of the inner sleeve is moved into the larger end portion of the outer sleeve until the smaller end portions of the inner and outer sleeves are adjacent each other and the larger end portions of the inner and outer sleeves are adjacent each other; feeding liquid reactive plastic material into the space between the outer sleeve and the inner sleeve as the inner sleeve is moved into the outer sleeve until the inner sleeve is fully inserted into the outer sleeve; attaching to the outside of the inner sleeve at equally spaced circumferential positions and at a plurality of spaced longitudinal locations lengths of reinforcing filaments that extend from their point of attachment to the inner sleeve to the larger end of said inner sleeve; wetting the filaments with liquid reactive plastic material before the filaments are pulled into the space between the outer sleeve and inner sleeve and allowing the liquid reactive plastic material to harden to produce a hollow rigid reinforced solid core between the sleeves.

17. The process of claim 16 wherein at each of the several lengthwise locations of the outer sleeve additional lengths of reinforcing filaments are introduced and circumferentially distributed into the space between the inner and outer sleeves wherein the additional lengths are firmly attached to similar reinforcing filaments previously introduced into the space at a location closer to the smaller end.

18. The process of claim 16 wherein the relative movement between the sleeves is performed by attaching a cable to the smaller end of the inner sleeve and extending the cable axially out of the smaller end of the outer sleeve, pulling the inner sleeve into the outer sleeve while the feeding of liquid reactive plastic material is performed during such pulling.

19. A process for manufacturing a filamentary reinforced plastic structural load bearing member, comprising positioning a tapered generally rigid hollow sleeve in a generally horizontal position, partially plugging the sleeve at its smaller end, passing a pulling cable through an opening in the plugged end to extend to the larger end, attaching to the pulling cable circumferentially at a plurality of spaced axial locations differing lengths of reinforcing filaments that extend from their attachment to the pulling cable to the larger end of said inner sleeve, wetting the filaments by the liquid reactive plastic material before being moved into the sleeve by being immersed in the liquid reactive plastic material prior to being positioned fully in the sleeve; feeding liquid reactive plastic material into the outer sleeve as the pulling movement is completed to extend the pulling cable fully out of the sleeve; and allowing the liquid reactive plastic to harden to produce a rigid reinforced solid core in the tapered sleeve.

20. The process of claim 19 wherein various lengths of reinforcing filaments are attached to and spacedly along the lengths of the reinforcing filaments attached to the cable to produce the solid core with generally a uniform density of filaments to reactive plastic material at any transverse cross-section of the member.

* * * * *